US010402222B2

United States Patent
Kim et al.

(10) Patent No.: US 10,402,222 B2
(45) Date of Patent: Sep. 3, 2019

(54) TASK MIGRATION METHOD AND APPARATUS

(71) Applicant: Samsung Electronics Co., Ltd., Suwon-si, Gyeonggi-do (KR)

(72) Inventors: Dohyoung Kim, Suwon-si (KR); Joohwan Kim, Gwangmyeong-si (KR); Hyunjin Park, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 426 days.

(21) Appl. No.: 14/645,875

(22) Filed: Mar. 12, 2015

(65) Prior Publication Data

US 2015/0261567 A1 Sep. 17, 2015

(30) Foreign Application Priority Data

Mar. 14, 2014 (KR) .................. 10-2014-0030405

(51) Int. Cl.
*G06F 9/46* (2006.01)
*G06F 9/48* (2006.01)
*G06F 9/50* (2006.01)

(52) U.S. Cl.
CPC .......... *G06F 9/4856* (2013.01); *G06F 9/5027* (2013.01); *G06F 9/5088* (2013.01); *Y02D 10/24* (2018.01); *Y02D 10/32* (2018.01)

(58) Field of Classification Search
None
See application file for complete search history.

(56) References Cited

U.S. PATENT DOCUMENTS

| 9,058,217 | B2* | 6/2015 | Ash | G06F 9/5088 |
|---|---|---|---|---|
| 2008/0263324 | A1 | 10/2008 | Sutardja et al. | |
| 2010/0125845 | A1 | 5/2010 | Sugumar et al. | |
| 2011/0047555 | A1* | 2/2011 | Lakshmanan | G06F 9/5088 718/105 |
| 2011/0314225 | A1* | 12/2011 | Nishihara | G06F 9/5088 711/119 |
| 2012/0180061 | A1* | 7/2012 | Rao | G06F 9/5088 718/104 |
| 2012/0291040 | A1* | 11/2012 | Breternitz | G06F 9/5083 718/104 |
| 2014/0108828 | A1* | 4/2014 | Breternitz | G06F 1/329 713/300 |
| 2014/0173623 | A1* | 6/2014 | Chang | G06F 9/5088 718/105 |
| 2014/0196050 | A1* | 7/2014 | Yu | G06F 9/5088 718/104 |
| 2015/0040136 | A1* | 2/2015 | Matthes | G06F 9/5094 718/104 |

FOREIGN PATENT DOCUMENTS

EP 1 862 904 A1 12/2007
EP 2 214 100 A1 8/2010

* cited by examiner

*Primary Examiner* — Diem K Cao
(74) *Attorney, Agent, or Firm* — Jefferson IP Law, LLP

(57) ABSTRACT

A method for recognizing an image and an apparatus using the same are provided. The method includes receiving image information including a first object and a second object, recognizing position information of the first object indicated by the second information in the received image information, extracting effective information included in the first object of the received image information in response to the recognized position information, and outputting related information corresponding to the recognized effective information.

19 Claims, 8 Drawing Sheets

TASK MIGRATION METHOD AND APPARATUS

CROSS-REFERENCE TO RELATED APPLICATION(S)

This application claims the benefit under 35 U.S.C. § 119(a) of a Korean patent application filed on Mar. 14, 2014 in the Korean Intellectual Property Office and assigned Serial No. 10-2014-0030405, the entire disclosure of which is hereby incorporated by reference.

TECHNICAL FIELD

The present disclosure relates to a task migration method and a task migration apparatus in a multi-processor system.

BACKGROUND

Recently, with advances in technology, a processor of a multi-core type (i.e., a multi-processor), as compared with a single-core type, has been proposed. A multi-processor can improve the operation performance of an application by simultaneously performing parallelization.

The above information is presented as background information only to assist with an understanding of the present disclosure. No determination has been made, and no assertion is made, as to whether any of the above might be applicable as prior art with regard to the present disclosure.

SUMMARY

A multi-processor determines a performance sequence of tasks or an allocation of a processor through scheduling in order to process a plurality of tasks by one operating system. The multi-processor calculates a load value for a task operation and controls operations thereof based on the calculated load value.

The multi-processor controls a critical value that is a determination condition based on one fixed value in order to control an operation with another processor. Since the multi-processor controls the operation thereof based on one fixed value regardless of a situation, a type, an attribute and the like of the task, unnecessary consumption of power occurs and a performance is degraded.

Aspects of the present disclosure are to address at least the above-mentioned problems and/or disadvantages and to provide at least the advantages described below. Accordingly, an aspect of the present disclosure is to provide a task migration method and a task migration apparatus which controls a task operation by configuring a critical condition differently according to a situation, a type, and an attribute of the task in a multi-processor environment including operating devices of different types are provided.

In accordance with an aspect of the present disclosure, a task migration method is provided. The task migration method includes generating a task, configuring the generated task with a critical condition defined according to a task type, allocating the task to which the critical condition is configured to a first operating device, and migrating the allocated task from the first operating device to a second operating device based on the configured critical condition.

In accordance with another aspect of the present disclosure, a task migration device is provided. The task migration device includes a first operating device, a second operating device, a scheduler unit configured to allocate a task to the first operating device or the second operating device, a critical condition configuring unit configured to differently configure a critical condition according to a type of the task, and a control condition generation determining unit configured to determine whether a performance control condition related to a task load and a performance control condition related to a specific situation are generated. The scheduler unit may control to transfer the allocated task to the first operating device or the second operating device based on the configured performance control condition.

A task migration method and a task migration apparatus according to various embodiments of the present disclosure configure a critical condition differently according to a task type, control a task migration operation, and thus the task migration method and the task migration apparatus can perform a scheduling which is optimized according to each task. In addition, the task migration method and the task migration apparatus control a task migration operation in correspondence to an attribute, a type or a situation of the task. Therefore, the task migration method and the task migration apparatus can reduce power consumption by minimizing a situation in which an operation of a processor is unnecessarily controlled, and can improve the performance of a system.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
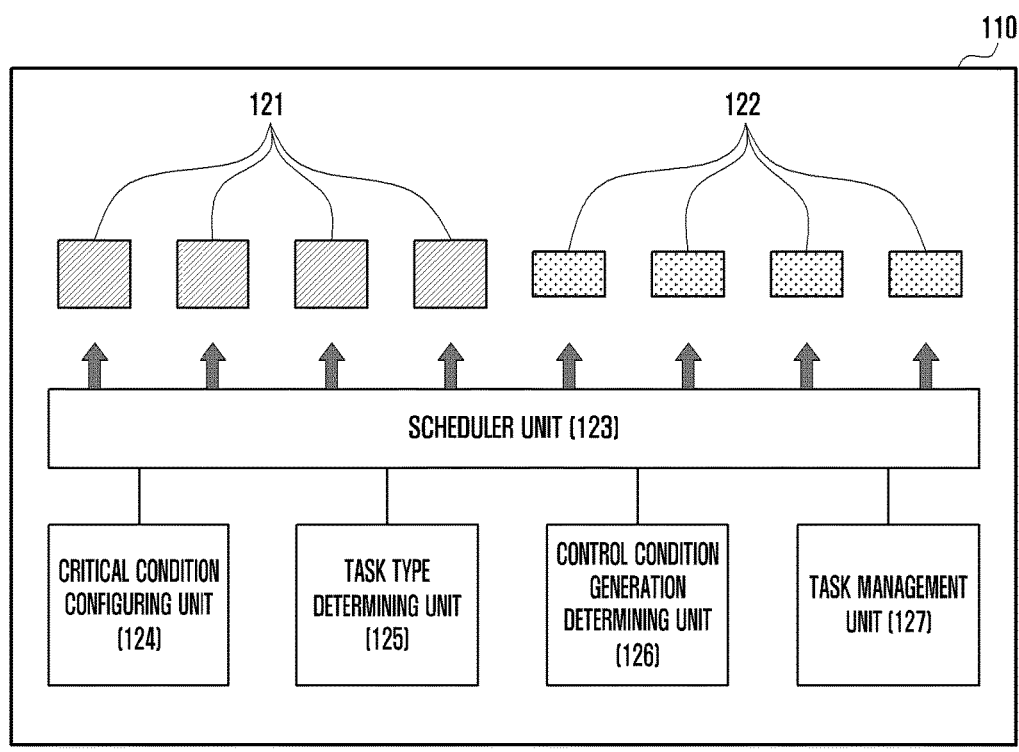
FIG. 1 illustrates a configuration of a multi-processor system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It is to be understood that the singular forms "a," "an," and "the" include plural referents unless the context clearly dictates otherwise. Thus, for example, reference to "a component surface" includes reference to one or more of such surfaces. It will be understood that the expressions "comprises" and "may comprise" are used to specify the presence of a disclosed function, operation, component, etc. but do not preclude the presence of one or more functions, operations, components, etc. It will be further understood that the terms "comprises" and/or "has" when used in this specification, specify the presence of a stated feature, number, step, operation, component, element, or a combination thereof but do not preclude the presence or addition of one or more other features, numbers, steps, operations, components, elements, or combinations thereof.

In the present disclosure, the expression "and/or" is taken as specific disclosure of each and any combination of the enumerated things. For example, A and/or B is to be taken as specific disclosure of each of A, B, and A and B.

As used herein, terms such as "first," "second," etc. are used to describe various components but not restrict the corresponding components. However, it is obvious that the components should not be defined by these terms. The terms are used only for distinguishing one component from another component. For example, a first component may be referred to as a second component and likewise, a second component may also be referred to as a first component, without departing from the teaching of the inventive concept.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

The terminology used herein is for the purpose of describing particular embodiments only and is not intended to be limiting of the disclosure. As used herein, the singular forms are intended to include the plural forms as well, unless the context clearly indicates otherwise.

Unless otherwise defined, all terms used herein have the same meaning as commonly understood by one of ordinary skill in the art to which this disclosure pertains, and should be interpreted neither as having an excessively comprehensive meaning nor as having an excessively contracted meaning. The general terms used herein should be interpreted according to the definitions in the dictionary or in the context and should not be interpreted as an excessively contracted meaning.

In the following description, the electronic device may be a device having a communication function. Examples of the electronic device may include at least one of a smartphone, a tablet personal computer (PC), a mobile phone, a video phone, an electronic book (ebook) reader, a desktop PC, a laptop PC, a netbook PC, a Personal Digital Assistant (PDA), a Portable Multimedia Player (PMP), an MP3 player, a mobile medical appliance, a camera, a wearable device (e.g., head-mounted-device (HMD) such as electronic glasses), electronic clothing, an electronic bracelet, an electronic neckless, an appcessory, an electronic tattoo, and a smart watch.

According to certain embodiments, examples of the electronic device may be a smart home appliance having a communication function. Examples of the smart home appliance may include at least one of a television, a Digital Video Disk (DVD) player, an audio player, a refrigerator, an air conditioner, a cleaner, an oven, a microwave oven, a laundry machine, an air cleaner, a set-top box, a TV box (e.g., Samsung HomeSync™, Apple TV™, and Google TV™), a game console, an electronic dictionary, an electronic key, a camcorder, and an electronic frame.

According to certain embodiments, examples of the electronic device may include at least one of a medical appliance (e.g., Magnetic Resonance Angiography (MRA), Magnetic Resonance Imaging (MRI), Computed Tomography (CT), camera, and ultrasonic device), a navigation device, a Global Positioning System (GPS) receiver, an Event Data Recorder (EDR), a Flight Data Recorder (FDR), a car infotainment device, an electronic equipment for a ship (e.g., marine navigation device and gyro compass), an avionics device, a security device, a Head Up Display (HUD), an industrial or home robot, an Automatic Teller Machine (ATM) of a financial institution, and a Point Of Sales (POS).

According to certain embodiments, examples of the electronic device may include furniture or part of a building/construction which has a communication function, an electronic board, an electronic signature receiving device, a projector, and a metering device (e.g., water, electricity, and electric wave metering devices). According to an embodiment, the electronic device may be one or any combination of the above enumerated devices. According to an embodiment, the electronic device may be a flexible device. However, it is obvious to those in the art that the electronic device of the present disclosure is not limited to the above devices.

A description is made of the electronic device according to various embodiments with reference to the accompanying drawings hereinafter. In the description of the various embodiments, the term 'user' may denote a person or a device (e.g., intelligent electronic device) which uses the electronic device.

According to various embodiments, an electronic device may include a heterogeneous multi-core processor including at least two cores having different types. The multi-core processor may have different operating devices among, for example, X86, X64, ARM, a graphic processing unit (GPU) and a digital signal processor (DSP).

In various embodiments, a 'processor' may include at least one core, and may be defined as a unit which may be independently connected to other elements of a device.

In various embodiments, an 'operating device' may be defined as a minimum unit of device which may execute and process a command of the inside of the processor, and may be referred to as a "core."

Hereinafter, a multi-processor system and an electronic device including the multi-processor system according to various embodiments will be described with reference to accompanying drawings.

FIG. 1 illustrates a configuration of a multi-processor system according to various embodiments of the present disclosure.

Referring to FIG. 1, a multi-processor 110 may include at least one first operating device 121, at least one second operating device 122, a scheduler unit 123, a critical condition configuring unit 124, a task type determining unit 125, a control condition generation determining unit 126 and a task management unit 127.

The first operating device 121 and the second operating device 122 may process a task allocated by the scheduler unit 123. Here, the task refers to an executable application having its own program area and certain program areas (e.g., a code, a stack and the like). In various embodiments, the first operating device may include a plurality of high performance large cores (e.g., Cortex-A15 and the like). The second operating device may include a plurality of low power smaller cores (e.g., Cortex-A7 and the like).

The scheduler unit 123 may determine whether the task is to be processed by the first operating device 121 or by the second operating device 122 and may arrange a priority of the task according to task information and a task workload. The scheduler unit 123 may select one core by which the task is to be processed by the first operating device or the second operating device, and may allocate the task to the selected operating device.

When a performance control condition is generated in relation to the task allocated to the operating device, the scheduler unit 123 may perform a task migration from one operating device to another operating device based on a defined rule. The task migration refers to sequential processes which process dynamic data and static data such that the dynamic data and the static data are operated in another memory or another processor. For example, the scheduler unit 123 may change a core (e.g., a source core) allocated to the task of which the migration is determined from an active state to an inactive state. The scheduler unit 123 may change a core (e.g., an object core) which is in an inactive state to an active state, and may control to migrate the task of the source core to the object core.

When a performance control condition is generated in relation to a processed task or a generated task, the scheduler unit 123 may allocate the task in which the performance control condition is generated to the first operating device 121 or migrate the task processed in the second operating device 122 to the first operating device 121 to enable the first operating device 121 to process the task. Alternatively, the scheduler unit 123 may allocate the task in which the performance control condition is generated to the second operating device 122 or may migrate the task processed in the first operating device 121 to the second operating device 122 to enable the second operating device 122 to process the task.

In various embodiments, the performance control condition may include a task load change condition and/or a specific situation condition. For example, the task load change condition may be a condition in which the task load is higher than a critical condition or lower than the critical condition, or a condition which a load slope value is changed from a predetermined slope value. The specific situation condition may include at least one of a condition in which an operating system is booted, a condition in which a touch event is detected, a condition in which an application is started to be executed, a condition in which a web site is loaded, a condition in which contents are downloaded or uploaded, a condition in which a battery capacity is lower than a predetermined value, a condition in which wired or wireless data is transmitted, a condition in which a program or other feature or object is changed to a foreground or a background, a condition in which a condition screen is updated, and/or a condition in which a display unit (e.g., a Liquid Crystal Display (LCD)) is turned on or turned off.

The critical condition configuring unit 124 may differently configure the critical condition for the migration according to a task type. The critical condition configuring unit 124 may include a critical condition database (DB) for configuring the critical condition in relation to the task. For example, the critical condition database may form a critical parameter set which is applied according to each task type in a table. The critical parameter may include an up level value, a down level value, a load slope value, an operation frequency value and the like for the task load, but is not limited thereto, and all parameters influencing the task operation may correspond to the critical parameter. Here, the up level value may be a reference value for performing a migration (e.g., a down migration) from the first operating device to the second operating device, and the down level value may be a reference value for performing a migration from the second operating device to the first operating device (e.g., an up migration). The up level value and the down level value may be configured to different values. In addition, the up level value and the down level value may be configured to different values according to the task type.

The critical condition configuring unit 124 may receive type information of the generated task from the task type determining unit 125, and may identify a critical condition corresponding to the task type based on the critical condition database. The critical condition configuring unit 124 may transfer the identified critical condition to the scheduler unit 123 and the control condition generation determining unit 126 such that the scheduler unit 123 and the control condition generation determining unit 126 are operated according to the identified critical condition according to the task type.

The task type determining unit 126 may determine the type of the task generated based on the task information or the task in which the performance control condition is generated. The task type determining unit 126 may transfer the determined task type to the critical condition configuring unit 124 and the control condition generation determining unit 126.

The task type may be divided into at least one type based on various conditions such as a task attribute, a task kind, a task situation and the like. The task type may be divided into various structures such as a hierarchical division structure, a single class structure, and the like. The task type may be divided according to one task, and may be divided according to a group, an attribute or an operation scenario. For example, the task type may be divided based on a workload amount, a data amount, a response speed, a process time, and the like. Alternatively, the task type may be divided according to an application type, and may be divided according to a specific operation event.

In various embodiments, the task type determining unit 125 may randomly or selectively group a task kind corresponding to the task type. For example, when it is assumed that the task type is divided into a type 1 and a type 2, the task may be grouped according to the task type by defining at least one task corresponding to the type 1 and defining at least one task corresponding to the type 2. The task type determining unit 125 may determine the task type by determining whether the task is defined to the type 1 or type 2 based on the information on the generated task or the task in which the performance control condition is generated.

The control condition generation determining unit 126 determines whether the performance control condition is generated in relation to the task. When the performance control condition is generated, the control condition generation determining unit 126 transfers this to the scheduler unit 123 based on a result of the determination. The task type determining unit 125 may monitor the task management unit 127 or monitor elements of a device (e.g., an input interface, a power control unit, and the like) in order to determine a task state change.

The control condition generation determining unit 126 may determine whether at least one of the conditions related to the task load, for example, the condition in which the task load is higher than the critical condition configured to the task or lower than the critical condition configured to the task, and the condition in which the load slope value is changed from the predetermined slope value, is generated.

The control condition generation determining unit 126 may determine whether at least one of a condition in which an operating system is booted, a condition in which a touch event is detected, a condition in which an application is started to be executed, a condition in which a web site is loaded, a condition in which contents are downloaded or uploaded, a condition in which a battery capacity is lower than a predetermined value, a condition in which wired or wireless data is transmitted, a condition in which a program or other feature or object is changed to a foreground or background, a condition in which a condition screen is updated, and a condition in which a display unit (e.g., an LCD) is turned on or turned off.

When the performance control condition is generated in relation to the task, the control condition generation determining unit 126 may transfer the task information in which the performance control condition is generated to the scheduler unit 123.

The task management unit 124 may generate, delete and/or change the task according to a user's request or according to a predetermined schedule. The task management unit 124 may monitor task performing operations by each of the first operating device 121 and the second operating device 122. The task management unit 124 may store the monitoring information in a database. For example, when a user requests an application execution function of an electronic device, the task management unit 124 may generate a task corresponding to the application execution function and transfer the task generation information to the scheduler unit 123.

Figure 2:
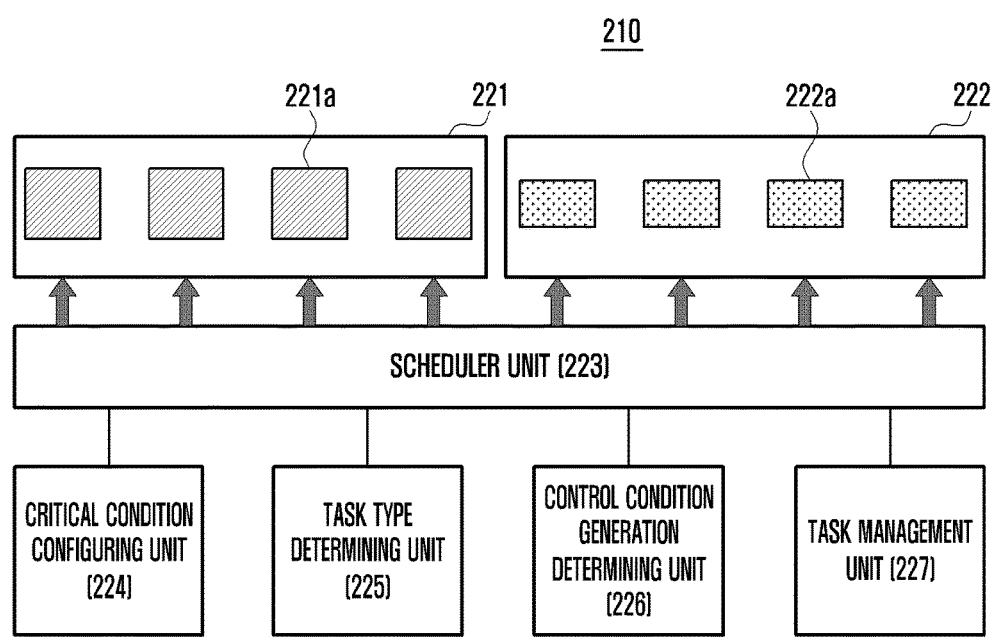
FIG. 2 illustrates a configuration of a multi-processor system according to various embodiments of the present disclosure.

FIG. 2 illustrates a multi-processor system environment according to various embodiments of the present disclosure.

Referring to FIG. 2, a multi-processor system environment 210 may include a first processor 221, a second processor 222, a scheduler unit 223, a critical condition configuring 224, a task type determining unit 225, a control condition generation determining unit 226 and a task management unit 227.

In various embodiments, the first processor 221 may include first operating devices 221a. The second processor 222 may include may include second operating devices 222a. For example, the first processor 221 may include a plurality of high performance large cores (e.g., Cortex-A15 and the like). The second processor 222 may include a plurality of low power smaller cores (e.g., Cortex-A7 and the like), but is not limited thereto.

In various embodiments, the first processor 221 and the second processor 222 may include the same type of cores.

The cores in the first processor 221 and the second processor 222 may process a task allocated by the scheduler unit 223.

The scheduler unit 223 may allocate the task to the first processor 221 or the second processor 222 such that the first processor 221 or the second processor 222 processes the task, or may arrange a priority of the task. The scheduler unit 223 may select a core to process the task, among operating devices in each processor, and may allocate the task to the selected core.

Hereinafter, operations and functions of the scheduler unit 223, the critical condition configuring unit 224, the task type determining unit 225, the control condition generation determining unit 226 and the task management unit 227 are substantially the same as the operations and functions of the scheduler unit 123, the critical condition configuring unit 124, the task type determining unit 125, the control condition generation determining unit 126, and the task management unit 127 described with reference to FIG. 1. Thus, descriptions of the scheduler unit 223, the critical condition configuring unit 224, the task type determining unit 225, the control condition generation determining unit 226 and the task management unit 227 are omitted.

Figure 3:
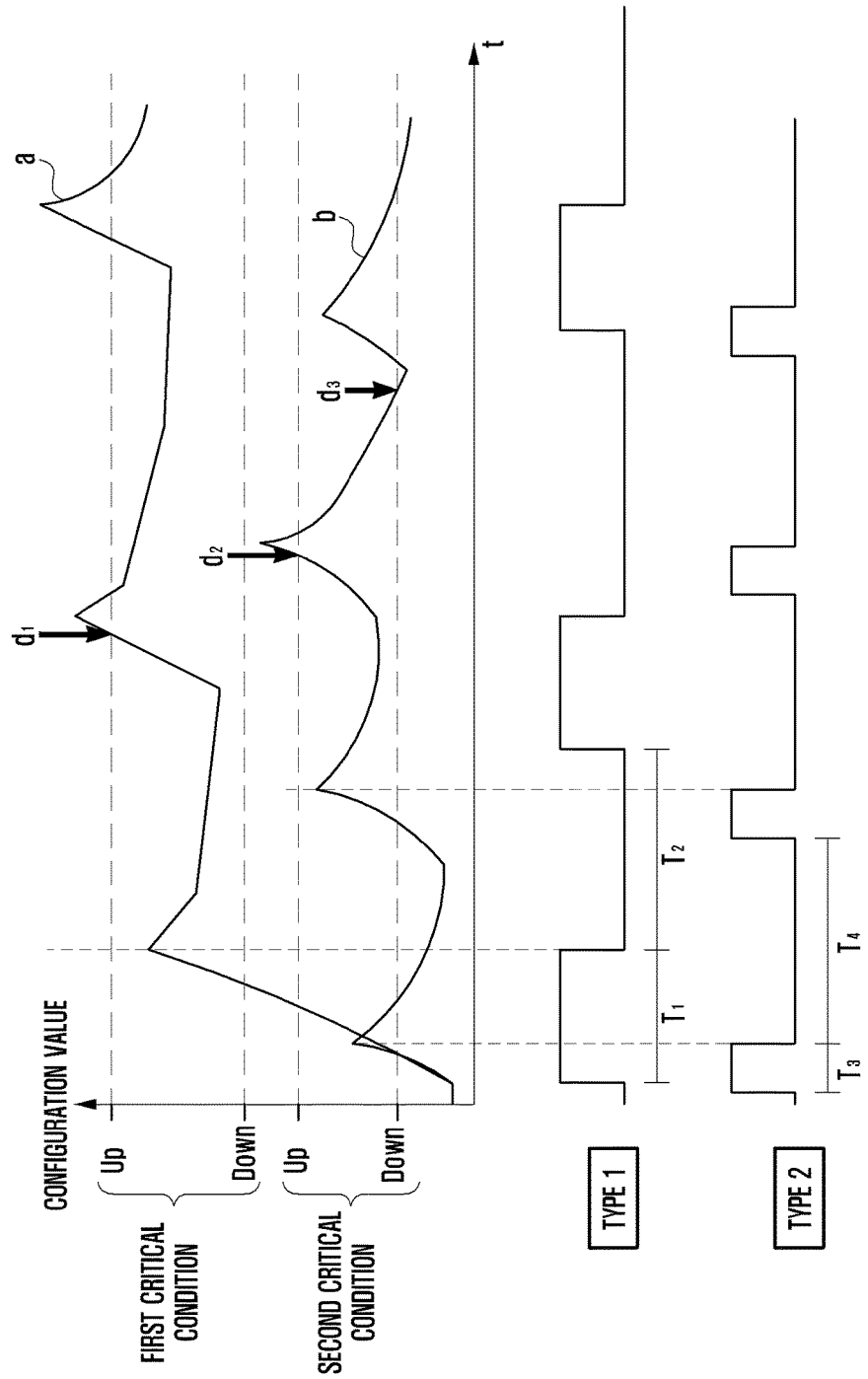
FIG. 3 illustrates an example of a task migration operation of a multi-processor according to various embodiments of the present disclosure.

FIG. 3 illustrates an example of a task migration operation of a multi-processor according to an embodiment of the present disclosure.

Referring to FIG. 3, a multi-processor according to various embodiments may differently configure a critical condition in which each task is migrated according to a task type. For example, the multi-processor may process a task of a type 1 and a task of a type 2. A change of a workload of the task may be different according to an operation period, a process time, data and the like of the task. For example, a task operation shown as a reference numeral a may have an execution time of a reference numeral T1 and a sleep time of a reference numeral T2, and may be changed in a load rate as shown by the reference numeral a. A task operation of a reference numeral b may have an execution time of a reference numeral T3 and a sleep time of a reference numeral T4, and may be changed in a load rate as shown by the reference numeral b.

In a case of a first task, the multi-processor may control to migrate the first task to another operating device based on a first critical condition level. In contrast, in a case of a second task, the multi-processor may control to migrate the second task to another operating device based on a second critical condition level. For example, the critical condition may be at least one of a task load value, a slope value of a load rate, and/or a weighted value for an operation frequency of an operating device, but is not limited thereto. The critical condition related to the task load may include an up level and a down level. The up level may be a reference value for migrating from a low power or low performance operating device to a high performance operating device, and the down level may be a reference value for migrating from the high performance operating device to the low power or low performance operating device. The multi-processor may configure the second task with a first critical condition (including the up level and the down level) to process the second task and may configure the second task with a second critical condition (including the up level and the down level) to process the second task.

Hereinafter, for convenience of description, it is assumed that the critical condition is the load value of the operating device, but another critical condition may be applied.

The first type of which a load rate is changed as shown by the reference numeral a is described. The multi-processor may allocate the task to the first operating device (e.g., a low power or low performance operating device) to process the task. The multi-processor may migrate the task to the second operating device (e.g., a high performance operating device) at a time d1 when the task load is higher than the up level of the first critical condition. Next, the load of the first task may be lower than the up level of the first critical condition. However, since the first task is not lower than the down level of the first critical condition, the second operating device can continuously process the first task.

The second type of which a load rate is changed as shown by the reference numeral b is described. The multi-processor may allocate the task to the first operating device to process the task. An execution time of the second type is shorter than that of the first type and an execution period of the second type is relatively longer than that of the first type. Therefore, a task average load of the second type may be relatively lower than that of the first type. The first type may be migrated to the second operating device at a time d2 when the task load of the first type is higher than the up level of the second critical condition, and the first type may be migrated to the first operating device at a time d3 when the first type is higher than the down level of the second critical condition.

Meanwhile, when the first type and the second type are migrated based on the same critical condition, the first type and the second type may be unnecessarily migrated or may not be migrated at a necessary time since an attribute, a state, or a condition of the task is not reflected.

Therefore, the multi-processor according to various embodiments of the present disclosure differently configures the critical condition for migration according to the task type, and thus the multi-processor can differently perform a task scheduling according to the task type.

For example, when the task type is classified as (1) a task type (e.g., web browsing and the like) in which a high performance is sporadically required, (2) a task type (e.g., a game and the like) in which a predetermined performance is consistently required, (3) a task type in which only a low performance is required (a background task and the like), (4) a task type (e.g., a response signal by an interruption) in which a fast response is required, (5) a task type (a screen updating and the like) in which a response is periodically required, and/or the like, the multi-processor may configure different critical conditions in correspondence to the classified task type.

In various embodiments, the critical condition may be differently configured according to an operation of the same task. For example, in a case of tasks classified as a touch event type, a touch operation may be classified in detail like (1) an operation (e.g., a flick and the like) in which a fast response speed is required and (2) an operation (e.g., a touch, a tap and the like) in which a fast response speed is not required, and the multi-processor may configure the critical condition according to the type classified in detail. For example, the critical condition in the case of the flick operation and the critical condition in the case of the touch operation may be differently configured.

Figure 4:
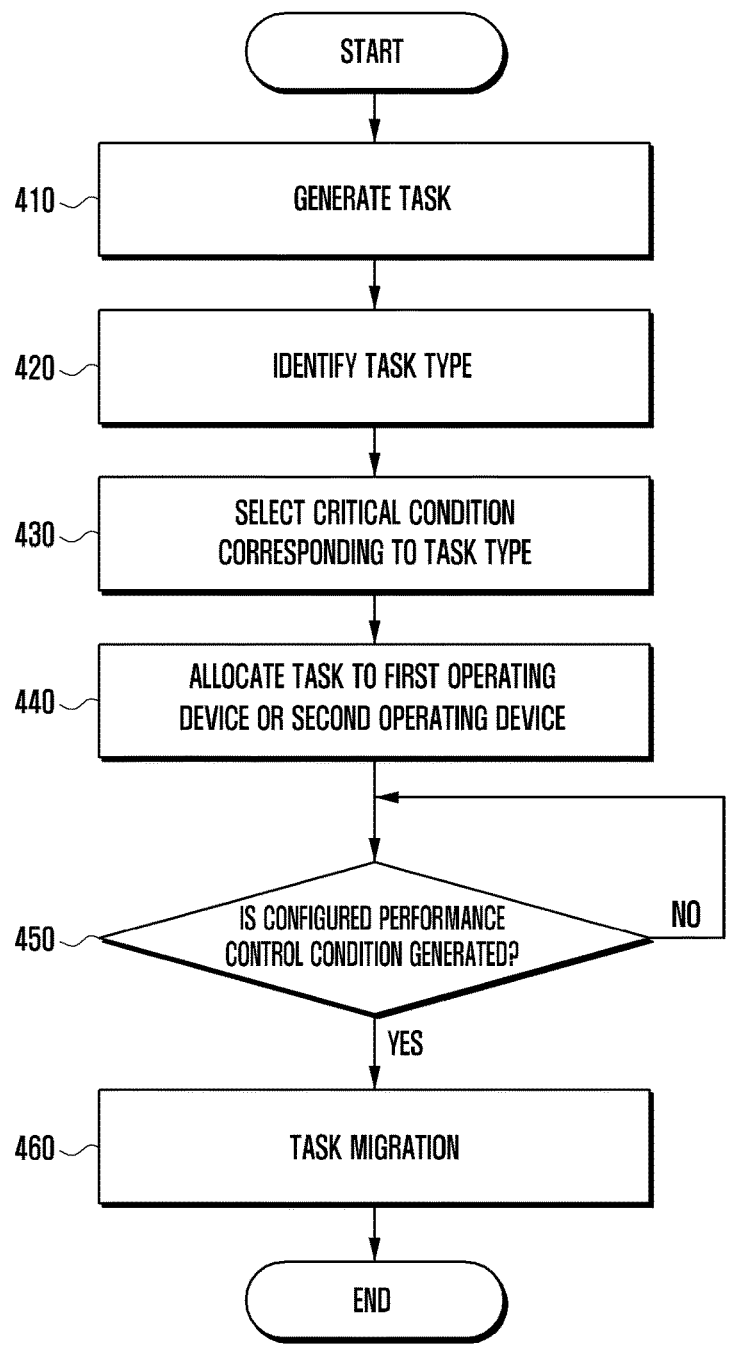
FIG. 4 illustrates a task migration method of a multi-processor system according to various embodiments of the present disclosure.

FIG. 4 illustrates a task migration method of a multi-processor system according to various embodiments of the present disclosure.

Referring to FIG. 4, the multi-processor may generate a task according to a user's request or a schedule at operation 410. For example, when power is supplied to an electronic device and/or an operating system is booted, the multi-processor may generate a task corresponding to a function configured in a time when the operating system is booted, and/or may generate a task related to an application executed in response to to application execution according to the user's request.

At operation 420, the multi-processor may identify a task type of a generated task, which corresponds to any of task types based on task information. For example, when a task related to a game is executed, the multi-processor may determine the task type as one in which a predetermined performance is consistently required.

At operation 430, the multi-processor may select a critical condition configured according to the determined task type, and may configure a task operation according to the selected critical condition.

At operation 440, the multi-processor may allocate the task in which the critical condition level is configured to a first operating device or a second operating device, and may control to process the task in the allocated operating device. For example, a task having a low load may be allocated to the first operating device, and a task having a high load may be allocated to the second operating device.

At operation 450, the multi-processor may monitor an operation of the task according to each operating device, and may determine whether a configured performance control condition is generated. For example, the multi-processor may determine whether at least one of a condition related to the task load, for example, a condition in which the task load is higher or lower than the critical condition configured to the task, and/or a condition in which a load slope value is changed from a predetermined slope value, is generated.

Alternatively, the multi-processor may determine whether at least one of a condition related to a specific situation, for example, a condition in which an operating system is booted, a condition in which a touch event is detected, a condition in which an application is started to be executed, a condition in which a web site is loaded, a condition in which contents are downloaded or uploaded, a condition in which a battery capacity is lower than a predetermined value, a condition in which wired or wireless data is transmitted, a condition in which a program or other feature or object is changed to a foreground or background, a condition in which a condition screen is updated, and a condition in which a display unit is turned on or turned off, is generated.

At operation 460, when the performance control condition configured in relation to the task is generated as a result of the determination, the multi-processor may migrate the task from the allocated operating device to another operating device. For example, the multi-processor may change a core (e.g., a source core) allocated to the task of which the migration is determined from an active state to an inactive state. The scheduler unit 123 may change a core (e.g., an object core) which is in an inactive state to an active state, and may control to migrate the task of the source core to the object core.

Meanwhile, when the performance control condition configured in relation to the task is not generated, the multi-processor may return to operation 450 and monitor whether the performance control condition is generated.

Figure 5:
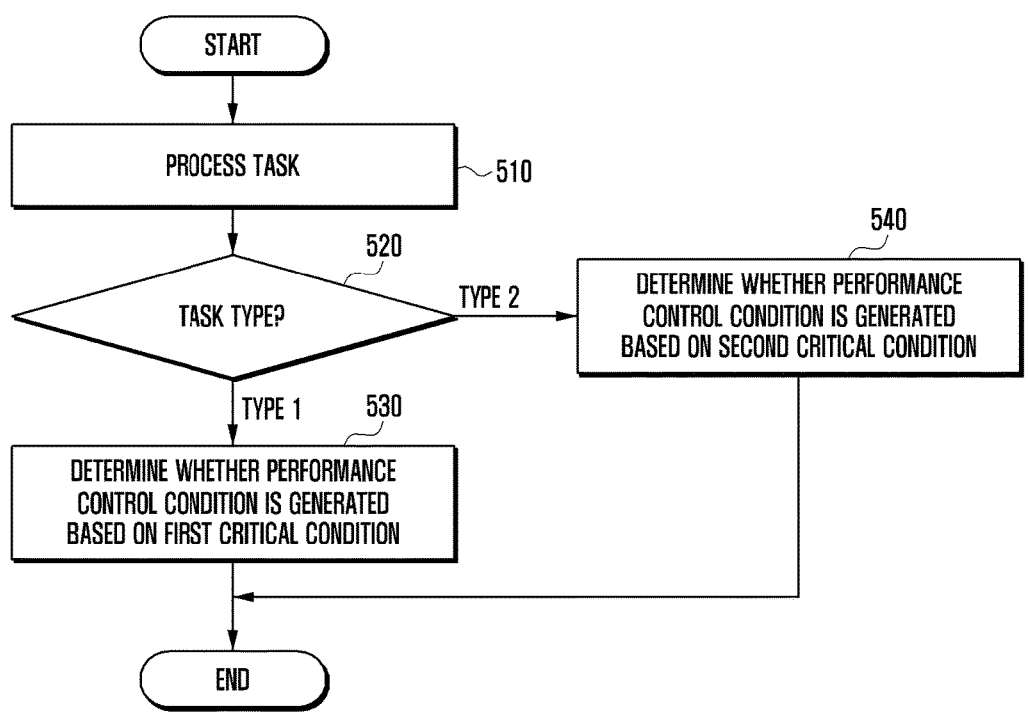
FIG. 5 illustrates a task migration method of a multi-processor system according to various embodiments of the present disclosure.

FIG. 5 illustrates a task migration method of a multi-processor system according to various embodiments of the present disclosure.

Referring to FIG. 5, the multi-processor may allocate a task to one core in a first operating device and a second operating device at operation 510. At operation 520, the multi-processor may determine a task type among task types defined based on allocated task information.

In various embodiments, the multi-processor may randomly or conditionally configure in advance at least one of tasks corresponding to task type. For example, tasks (e.g., a response signal by an interruption, an event signal in which a fast screen change is required, and the like) in which a fast response is required may be defined as a group of a type 1, and other normal tasks may be configured as a group of a type 2. At this time, critical conditions of the type 1 and the type 2 may be differently configured.

At operation 530, when the type of the allocated task corresponds to the type 1, the multi-processor may determine whether the performance control condition is generated based on a first critical condition. In contrast, at operation 540, when the type of the allocated task corresponds to the type 2, the multi-processor may determine whether the performance control condition is generated based on a second critical condition.

For example, in a case wherein an application related task type is the type 1 such as an application entry or a background operation, a task migration may be performed when a first performance control condition (e.g., an application entry time or a background entry time) is generated, and in a case wherein the application related task type is the type 2 such as an application function operation, the task migration may be performed when a second performance control condition (e.g., a time when the critical condition according to the task load is satisfied) is generated.

Alternatively, for example, in a case wherein a state of a touch related task is the type 1, the task migration may be performed when the first performance control condition is generated, and in a case wherein a state of the touch related task is the type 2, the task migration may be performed when the second performance control condition is generated.

Although not shown, the multi-processor according to various embodiments does not limit the number of task types, and when there is another task type except for the type 1 and/or the type 2, the multi-processor may identify whether the performance control condition is generated based on configured criticals configured according to each corresponding task type.

Figure 6:
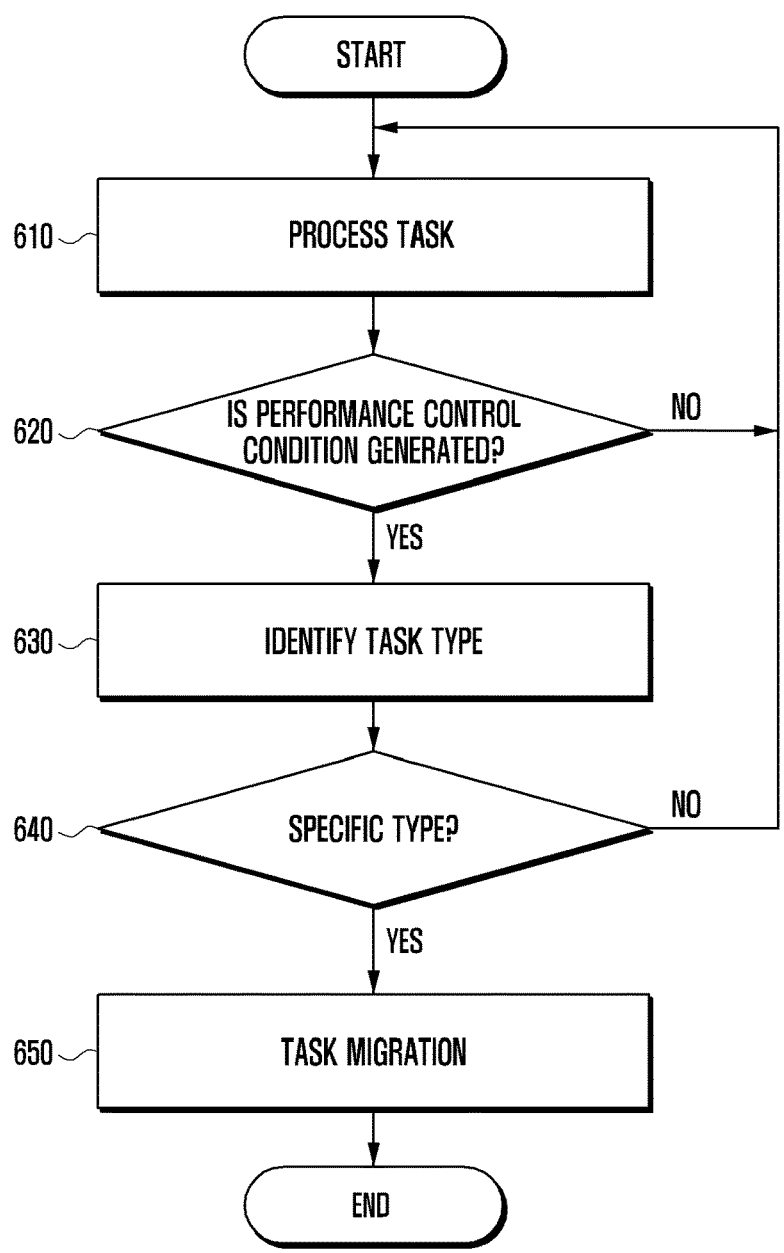
FIG. 6 illustrates a task migration method of a multi-processor system according to various embodiments of the present disclosure.

FIG. 6 illustrates a task migration method of a multi-processor system according to various embodiments of the present disclosure.

Referring to FIG. 6, the multi-processor may allocate a task to one operating device to process the task at operation 610. At operation 620, the multi-processor may determine whether a performance control condition is generated in relation to the task which is being processed. For example, the multi-processor may determine whether a performance control condition for a specific situation is generated. The specific situation condition may include at least one of a condition in which power is applied to an electronic device and thus an operating system is booted, a condition in which a touch event related to an application is detected, a condition in which an application is started to be executed, a condition in which a web site is loaded, a condition in which contents are downloaded or uploaded, a condition in which a battery capacity is lower than a predetermined value, a condition in which wired or wireless data is transmitted, a condition in which a program or other feature or object is changed to a foreground or background, a condition in which a condition screen is updated, and/or a condition in which a display unit is turned on or turned off.

At operation 630, the multi-processor may identify a type of the task of which the performance control condition is generated. At operation 640, the multi-processor may determine whether the type of the task is included in a specific group. When the type of the task is included in the specific group, the multi-processor may perform a task migration in response to the performance control condition generation at operation 650. When the type of the task is not included in the specific group, the multi-processor may return to operation 610 to enable the allocated operating device to process the task rather than performing the task migration.

In an embodiment, when the condition for the specific situation is generated in relation to the task, the multi-processor may perform the task migration regardless of a task load.

In an embodiment, even though the condition for the specific situation is generated in relation to the task, when the task is divided into the specific type, the multi-processor may perform the task migration, and when the task does not correspond to the specific type, the multi-processor may enable a processing operating device to process the task rather than performing the task migration.

Figure 7:
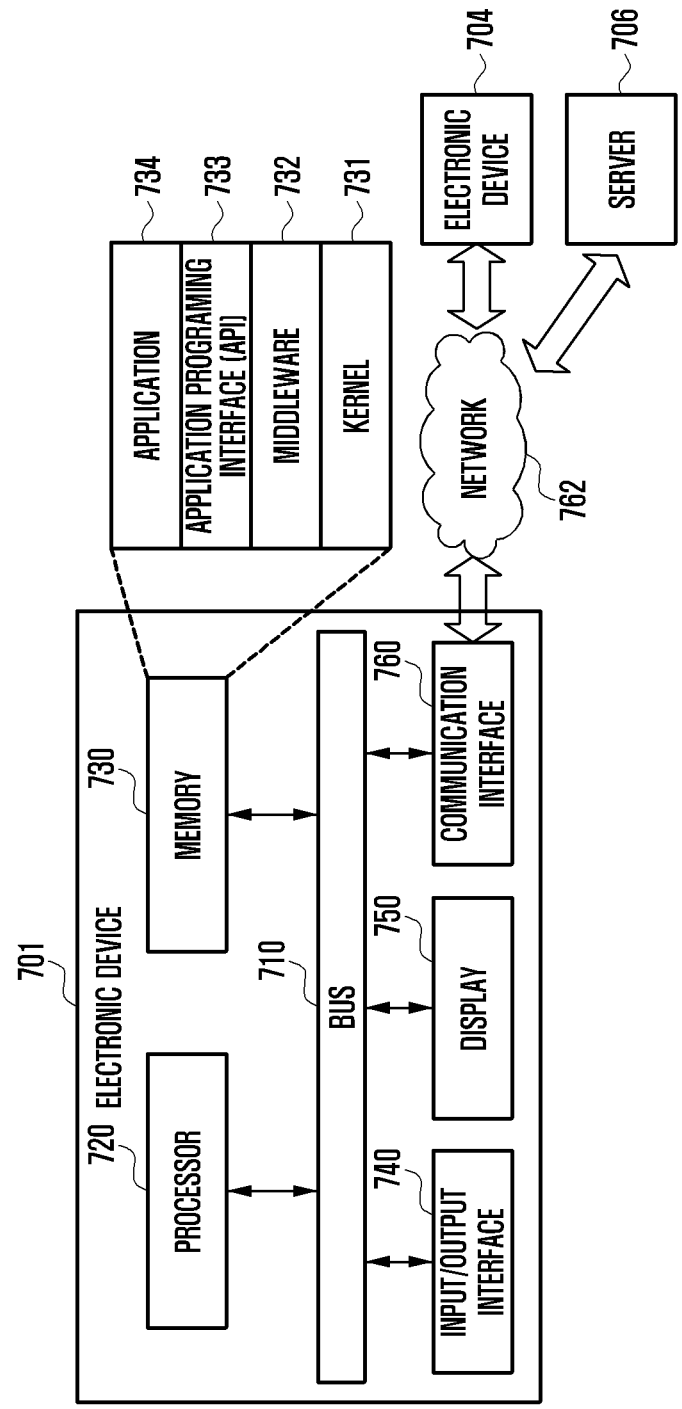
FIG. 7 illustrates a network environment including an electronic device according to various embodiments of the present disclosure.

FIG. 7 illustrates a network environment including an electronic device according to various embodiments of the present disclosure.

Referring to FIG. 7, the electronic device 701 includes a bus 710, a processor 720, a memory 730, an input/output interface 740, a display 750, and a communication interface 760.

The bus 710 may include circuitry which connects the aforementioned components to each other to communicate signals (e.g., control messages) therebetween.

The processor 720 receives a command from any of the aforementioned components (e.g., the memory 730, the input/output interface 740, the display 750, and/or the communication interface 760) through the bus 710, interprets the command, and executes an operation or processes data according to the decrypted command.

The memory 730 may store the command or data received from the processor 720 or other components (e.g., the input/output interface 740, the display 750, the communication interface 760, etc.) or generated by the processor 720 or other components. The memory 730 may store program modules including a kernel 731, middleware 732, an Application Programming Interface (API) 733, applications 734, etc. Each programming module may be implemented as software, firmware, hardware, and any combination thereof.

The kernel 731 may control or manage the system resources (e.g., the bus 710, the processor 720, the memory 730, etc.) for use in executing the operation or function implemented with the middleware 732, the API 733, and/or the application 734. The kernel 731 also may provide an interface allowing the middleware 732, API 733, and/or application 734 to access the components of the electronic device 701 to control or manage.

The middleware 732 may work as a relay of data communicated between the API 733 or application 734 and the kernel 731. The middle 732 may execute control of the task requests from the applications 734 in such a way of assigning priority for use of the system resource (e.g., the bus 710, the processor 720, the memory 730, etc.) of the electronic device to at least one of the applications 734.

The API 733 is the interface for the applications 734 to control the function provided by the kernel 731 or the middleware 732 and may include at least one interface or function (e.g., a command) for file control, window control, image control, and/or text control.

According to various embodiments, the applications 734 may include a Short Messaging Service/Multimedia Messaging Service (SMS/MMS) application, an email application, a calendar application, an alarm application, a health care application (e.g., an application of measuring a quantity of motion or a blood sugar level, etc.), and/or an environmental information application (e.g., atmospheric pressure, humidity, temperature applications, etc.). Additionally or alternatively, the application 734 may be an application related to information exchange between the electronic device 701 and other external electronic device (e.g., an electronic device 704). Examples of the information exchange application may include a notification relay application for relaying specific information to the external electronic device 704 and a device management application for managing the external electronic device.

For example, the notification relay application may be provided with a function of relaying the alarm information generated by the other applications (e.g., the SMS/MMS application, the email application, the health care application, the environmental information application, etc.) of the electronic device to an external electronic device (e.g., the electronic device 704). Additionally or alternatively, the notification relay application may provide the user with the notification information received from an external electronic device (e.g., the electronic device 704). The electronic device application may manage (e.g., install, delete, update, etc.) the function of an external electronic device (e.g., turning-on/off of the electronic device 704 itself (or a part of it) or adjusting the brightness (or resolution) of the display) which communicates with the electronic device 701 or the service (e.g., a communication or messaging service) provided by the external electronic device or an application running on the external device.

According to various embodiments, the applications 734 may include an application designated according to the property (e.g., type) of an external electronic device (e.g., the electronic device 704). If the external electronic device is an MP3 player, the applications 734 may include a music playback application. Similarly, if the external electronic device is a mobile medical appliance, the applications 734 may include a health care application. According to an embodiment, the application 734 may include at least one application designated to the electronic device 701 or the applications received from the external electronic device (e.g., a server 706 and the electronic device 704).

The input/output interface 740 delivers the command or data input by the user through an input/output device (e.g., a sensor, a keyboard, a touchscreen, etc.) to the processor 720, the memory 730, and/or the communication interface 760, through the bus 710. For example, the input/output interface 740 may provide the processor 720 with the data corresponding to the touch made by the user on the touchscreen. The input/output interface 740 may output the command or data (which is received from the processor 720, the memory 730, or the communication interfaced 760, through the bus 710) through the input/output device (e.g., a speaker and a display). For example, the input/out interface 740 may output the voice data processed by the processor 720 to the user through the speaker.

The display 750 may present various information (e.g., multimedia data, text data, etc.) to the user.

The communication interface 760 may establish a communication connection of the electronic device 701 with an external device (e.g., electronic device 704, the server 706, etc.). For example, the communication interface 760 connects to a network 762 through a wireless or wired link for communication with the external device. Examples of the wireless communication technology may include wireless fidelity (Wi-Fi), Bluetooth (BT), Near Field Communication (NFC), GPS, and cellular communication technology (e.g., Long Term Evolution (LTE), LTE-Advanced (LTE-A), Code Division Multiple Access (CDMA), Wideband CDMA (WCDMA), Universal Mobile Telecommunication System (UMTS), Wireless-Broadband (WiBro), and General System for Mobile communications (GSM)). Examples of the wired communication technology may include Universal Serial Bus (USB), High Definition Multimedia Interface (HDMI), Recommended Standard 232 (RS-232), and Plain Old Telephone Service (POTS).

According to an embodiment, the network 762 may be a telecommunication network. The communication network may include at least one of a computer network, the Internet, the Internet of Things, and a telephone network. According to an embodiment, the communication protocol between the electronic device 701 and an external device (e.g., a transport layer protocol, a data link layer protocol, a physical layer protocol, etc.) may be supported by at least one of the applications 734, the API 733, the middleware 732, the kernel 731, and/or the communication interface 760.

Figure 8:
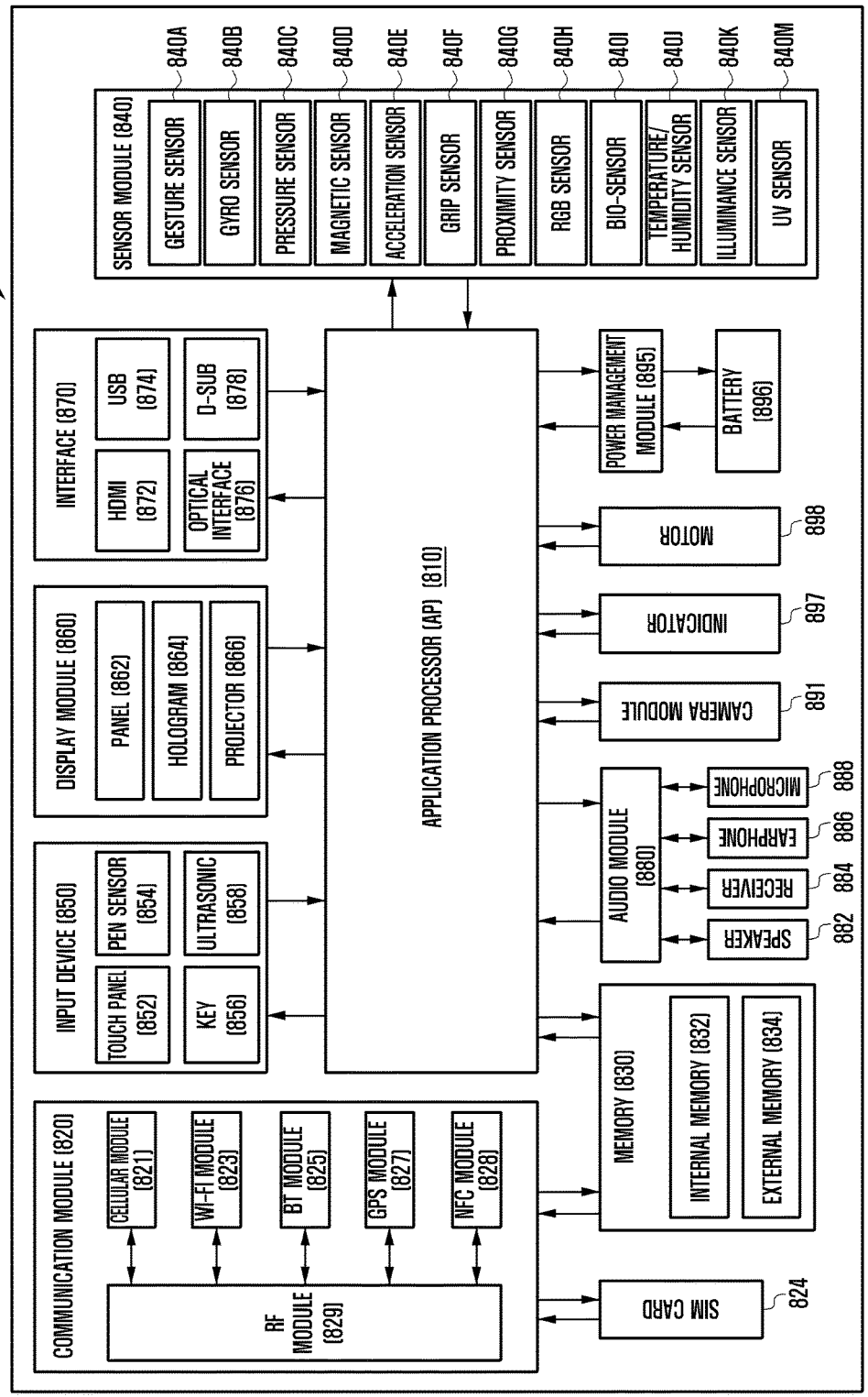
FIG. 8 illustrates a block diagram of an electronic device according to various embodiments of the present disclosure.

FIG. 8 is a block diagram illustrating a configuration of an electronic device according to various embodiments of the present disclosure. The electronic device illustrated in FIG. 8 may be of the whole or a part of the electronic device 701 illustrated in FIG. 7.

Referring to FIG. 8, the electronic device 801 may include an Application Processor (AP) 810, a communication module 820, a Subscriber Identity Module (SIM) card 824, a memory 830, a sensor module 840, an input device 850, a display 860, an interface 870, an audio module 880, a camera module 891, a power management module 895, a battery 896, an indicator 897, and a motor 898.

The AP 810 may operate an Operating System (OS) and/or application programs to control a plurality of hardware and/or software components connected to the AP 810 and perform data-processing and operations on multimedia data. For example, the AP 810 may be implemented in the form of System on Chip (SoC). According to an embodiment, the AP 810 may include a Graphic Processing Unit (GPU) (not shown).

The communication module 820 (e.g., the communication interface 160) may perform data communication with other electronic devices (e.g., the electronic device 104, the server 106, etc.) through a network. According to an embodiment, the communication module 820 may include a cellular module 821, a Wi-Fi module 823, a BT module 825, a GPS module 827, an NFC module 828, and a Radio Frequency (RF) module 829

The cellular module 821 is responsible for voice and video communication, text messaging, and/or Internet access services through a communication network (e.g., LTE, LTE-A, CDMA, WCDMA, UMTS, WiBro, and GSM networks). The cellular module 821 may perform identification and authentication of electronic devices in the communication network using the SIM card 824. According to an embodiment, the cellular module 821 may perform at least one of the functions of the AP 810. For example, the cellular module 821 may perform at least a part of the multimedia control function.

According to an embodiment, the cellular module 821 may include a Communication Processor (CP). The cellular module 821 may be implemented in the form of SOC.

Although the cellular module 821 (e.g., the communication processor), the memory 830, and the power management module 895 are depicted as independent components separated from the AP 810, the present disclosure is not limited thereto but may be embodied in a way that the AP includes at least one of the components (e.g., the cellular module 821).

According to an embodiment, each of the AP 810 and the cellular module 821 (e.g., the communication processor) may load a command or data received from at least one of the components on a non-volatile or volatile memory and process the command or data. The AP 810 or the cellular module 821 may store the data received from other components or generated by at least one of other components in the non-volatile memory.

Each of the Wi-Fi module 823, the BT module 825, the GPS module 827, and the NFC module 828 may include a processor for processing the data it transmits/receives. Although the cellular module 821, the Wi-Fi module 823, the BT module 825, the GPS module 827, and the NFC module 828 are depicted as independent blocks, at least two of them (e.g., the communication processor corresponding to the cellular module 821 and the Wi-Fi processor corresponding to the Wi-Fi module 823) may be integrated in the form of SoC.

The RF module 829 is responsible for data communication, e.g., transmitting/receiving RF signals. Although not depicted, the RF module 829 may include a transceiver, a Power Amplifier Module (PAM), a frequency filter, and a Low Noise Amplifier (LNA). The RF module 829 also may include the elements for transmitting/receiving an electric wave in free space, e.g., a conductor or a conductive wire. Although FIG. 8 is directed to the case where the Wi-Fi module 823, the BT module 825, the GPS module 827, and the NFC module 828 are sharing the RF module 829, the present disclosure is not limited thereto but may be embodied in a way that at least one of the Wi-Fi module 823, the BT module 825, the GPS module 827, and the NFC module 828 transmits/receives RF signals an independent RF module.

The SIM card 824 may be designed so as to be inserted into a slot formed at a predetermined position of the electronic device. The SIM card 824 may store unique identity information (e.g., an Integrated Circuit Card Identifier (IC-CID)) or subscriber information (e.g., an International Mobile Subscriber Identity (IMSI)).

The memory 830 (e.g., the memory 130) may include at least one of an internal memory 832 and an external memory 834. The internal memory 832 may include at least one of a volatile memory (e.g., a Dynamic Random Access Memory (DRAM), a Static RAM (SRAM), a Synchronous Dynamic RAM (SDRAM) or a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, and/or a NOR flash memory)

According to an embodiment, the internal memory 832 may be a Solid State Drive (SSD). The external memory 834 may be a flash drive such as a Compact Flash (CF), a Secure Digital (SD), a micro-SD, a Mini-SD, an extreme Digital (xD), and a Memory Stick. The external memory 834 may be connected to the electronic device 801 through various interfaces functionally. According to an embodiment, the electronic device 801 may include a storage device (or storage medium) such as hard drive.

The sensor module 840 may measure a physical quantity or check the operation status of the electronic device 801 and convert the measured or checked information to an electric signal. The sensor module 840 may include at least one of a gesture sensor 840A, a Gyro sensor 840B, an atmospheric pressure sensor 840C, a magnetic sensor 840D, an acceleration sensor 840E, a grip sensor 840F, a proximity sensor 840G, a color sensor 840H (e.g., a Red, Green, Blue (RGB) sensor), a bio sensor 840I, a temperature/humidity sensor 840J, an illuminance sensor 840K, and/or a Ultra Violet (UV) sensor 840M. Additionally or alternatively, the sensor module 840 may include an E-nose sensor (not shown), an Electromyography (EMG) sensor (not shown), an Electroencephalogram (EEG) sensor (not shown), an Electrocardiogram (ECG) sensor (not shown), an Infrared (IR) sensor (not shown), an iris sensor (not shown), and/or a fingerprint sensor (not shown). The sensor module 840 may further include a control circuit for controlling at least one of the sensors included therein.

The input device 850 may include a touch panel 852, a (digital) pen sensor 854, keys 856, and an ultrasonic input device 858. The touch panel 852 may be one of a capacitive, a resistive, an infrared, and/or a microwave type touch panel. The touch panel 852 may include a control circuit. In the case of the capacitive type touch panel, it is possible to detect physical contact or approximation. The touch panel 852 may further include a tactile layer. In this case, the touch panel 852 may provide the user with a haptic reaction.

The (digital) pen sensor 854 may be implemented with a sheet with the same or similar way as a touch input of the user or a separate recognition sheet. The keys 856 may include physical buttons, an optical key, and/or a keypad. The ultrasonic input device 858 is a device capable of checking data by detecting a sound wave through a microphone 888 and may be implemented for wireless recognition. According to an embodiment, the electronic device 801 may receive the user input made by means of an external device (e.g., a computer, a server, etc.) connected through the communication module 820.

The display 860 (e.g., the display module 150) may include a panel 862, a hologram device 864, and a projector 866. The panel 862 may be an LCD panel or an Active Matrix Organic Light Emitting Diodes (AMOLED) panel. The panel 862 may be implemented so as to be flexible, transparent, and/or wearable. The panel 862 may be implemented as a module integrated with the touch panel 852. The hologram device 864 may present a 3-dimensional image in the air using interference of light. The projector 866 may project an image to a screen. The screen may be placed inside or outside the electronic device. According to an embodiment, the display 860 may include a control circuit for controlling the panel 862, the hologram device 864, and the projector 866.

The interface 870 may include an HDMI 872, a Universal Serial Bus (USB) 874, an optical interface 876, and a D-subminiature (D-sub) 878. The interface 870 may include the communication interface 160 as shown in FIG. 1. Additionally or alternatively, the interface 870 may include a Mobile High-definition Link (MHL) interface, an SD/MMC card interface, and/or an infrared Data Association (irDA) standard interface.

The audio module 880 may convert sound to an electric signal and vice versa. At least a part of the audio module 880 may be included in the input/output interface 140 as shown in FIG. 1. The audio module 880 may process the audio information input or output through a speaker 882, a receiver 884, an earphone 886, and the microphone 888.

The camera module 891 is a device capable of taking still and motion pictures and, according to an embodiment, includes at least one image sensor (e.g., front and rear sensors), a lens (not shown), an Image Signal Processor (ISP) (not shown), and/or a flash (e.g., an LED, xenon lamp etc.) (not shown).

The power management module 895 may manage the power of the electronic device 801. Although not shown, the power management module 895 may include a Power Management Integrated Circuit (PMIC), a charger Integrated Circuit (IC), a battery, and/or a battery or fuel gauge.

The PMIC may be integrated into an integrated circuit or SoC semiconductor. The charging may be classified into wireless charging and wired charge. The charger IC may charge the battery and protect the charger against overvoltage or overcurrent. According to an embodiment, the charger IC may include at least one of wired charger and wireless charger ICs. Examples of the wireless charging technology includes resonance wireless charging and electromagnetic wave wireless charging, and there is a need of extra circuit for wireless charging such as coil loop, resonance circuit, and diode.

The battery gauge may measure the residual power of the battery 896, a charging voltage, a current, and/or a temperature. The battery 896 may store or generate power and supply the stored or generated power to the electronic device 801. The battery 896 may include a rechargeable battery or a solar battery.

The indicator 897 may display an operation status of the electronic device 801 or a part of the electronic device, a booting status, a messaging status, and/or a charging status. The motor 898 may convert the electronic signal to a mechanical vibration. Although not shown, the electronic device 801 may include a processing unit (e.g., a GPU) for supporting mobile TV. The processing unit for supporting the mobile TV may be able to process the media data abiding by the broadcast standards such Digital Multimedia Broadcasting (DMB), Digital Video Broadcasting (DVB), and media flow.

The above enumerated components of the electronic device of the present disclosure may be implemented into one or more parts, and the names of the corresponding components may be changed depending on the kind of the electronic device. The electronic device of the present disclosure may include at least one of the aforementioned components with omission or addition of some components. The components of the electronic device of the present disclosure may be combined selectively into an entity to perform the functions of the components equally as before the combination.

The term "module" according to the embodiments of the disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of Application-Specific Integrated Circuit (ASIC) chip, Field-Programmable Gate Arrays (FPGAs), and Programmable-Logic Device known or to be developed for certain operations.

According to various embodiments of the present disclosure, the devices (e.g., modules or their functions) or methods may be implemented by computer program instructions stored in a computer-readable storage medium. In the case that the instructions are executed by at least one processor (e.g., the processor 120), the at least one processor may execute the functions corresponding to the instructions. The computer-readable storage medium may be the memory 130. At least a part of the programming module may be implemented (e.g., executed) by the processor 120. At least part of the programming module may include modules, programs, routines, sets of instructions, and processes for executing the at least one function.

The computer-readable storage medium includes magnetic media such as a floppy disk and a magnetic tape, optical media including a Compact Disc (CD) ROM and a DVD ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device can be implemented with one or more software modules for executing the operations of the various embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A task migration method of a multi-core processor system of an electronic device, the method comprising:
   generating a task;
   determining a task type corresponding to the generated task;
   determining a critical condition corresponding to the determined task type;
   allocating the task to at least one of a first operating device or a second operating device based on the determined critical condition;
   determining whether a performance control condition is generated based on the allocated task, the performance control condition comprising a condition in which a load slope value of a load rate corresponding to the task changes from a predetermined slope value; and
   migrating the allocated task to another operating device based on a result of the determining of whether the performance control condition is generated.

2. The method of claim 1, wherein the determining of the critical condition comprises:
   determining a critical parameter configured in correspondence with the determined task type.

3. The method of claim 2, wherein the determining of the critical condition comprises:
   determining a critical parameter corresponding to a first critical condition when the generated task is a first type; and
   determining a critical parameter corresponding to a second critical condition when the generated task is a second type.

4. The method of claim 1, wherein the task type includes at least one of a task type in which a high performance is sporadically required, a task type in which a predetermined performance is consistently required, a task type in which only a low performance is required, or a task type in which a fast response is required, and the determining of the critical condition comprises determining the critical conditions differently according to the task type.

5. The method of claim 1, wherein the migrating comprises:
checking whether at least one of a change condition of a task load or a specific situation condition with the task is generated based on the critical condition;
identifying the task type in which the condition is generated;
when the task type corresponds to a specific type, migrating the task to the other operating device; and
when the task type does not correspond to the specific type, operating the task in the allocated operating device.

6. The method of claim 1, wherein the task type is divided based on at least one of a task workload amount, a data processing amount, a response speed, a processing time, an application type, or an operation scenario.

7. An electronic device in a multi-core processor system, the electronic device comprising:
a first operating device in the multi-core processor system;
a second operating device in the multi-core processor system;
a scheduler configured to allocate a task to at least one of the first operating device or the second operating device;
a critical condition designer configured to differently configure a critical condition corresponding to a task type; and
a multi-core processor configured to:
generate the task,
determine the task type corresponding to the generated task,
determine, by the critical condition designer, the critical condition corresponding to the determined task type,
allocate, by the scheduler, the task to at least one of the first operating device or the second operating device based on the determined critical condition,
determine whether a performance control condition related to a load of the task and a performance control condition related to a specific situation of the electronic device are generated based on the allocated task, the performance control condition related to the load of the task comprising a condition in which a load slope value of a load rate corresponding to the task changes from a predetermined slope value, and
migrate the allocated task to another operating device based on a result of the determining of whether the performance control condition related to the load of the task is generated.

8. The electronic device of claim 7, wherein the multi-core processor is further configured to:
determine whether the load of the task is higher than the critical condition or lower than the critical condition,
transfer a state change of the task to the scheduler,
check whether the performance control condition related to the task is generated, and
transfer information on the task of which the performance control condition is generated to the scheduler.

9. The electronic device of claim 7, wherein the scheduler is further configured to:
transfer the task based on a first critical condition when the task comprises a first type, and
transfer the task based on a second critical condition when the task comprises a second type.

10. The electronic device of claim 7, wherein the scheduler is further configured to:
identify the task type of the performance control condition related to the specific situation when the performance control condition related to the specific situation is generated,
when the task type comprises a specific type, transfer the task to the other operating device, and
when the task type does not comprise the specific type, control to process the task by the allocated operating device.

11. The electronic device of claim 8, wherein the critical condition designer is further configured to divide the task type based on at least one of a task workload amount, a data process amount, a response speed, a process time, an application type, or an operation scenario.

12. The electronic device of claim 7, wherein the task type includes at least one of a task type in which a high performance is sporadically required, a task type in which a predetermined performance is consistently required, a task type in which only a low performance is required, or a task type in which a fast response is required.

13. The electronic device of claim 7, wherein the performance control condition related to a specific situation of the electronic device comprises at least one of a condition in which an operating system is booted, a condition in which a touch event is detected, a condition in which an application is started to be executed, a condition in which a web site is loaded, a condition in which contents are downloaded or uploaded, a condition in which a battery capacity is lower than a predetermined value, a condition in which wired or wireless data is transmitted, a condition in which a program or other feature or object is changed to a foreground or background, a condition in which a condition screen is updated, or a condition in which a display of the electronic device is turned on or turned off.

14. A non-transitory computer-readable storage medium storing instructions thereon that, when executed, cause at least one processor to perform a process comprising:
generating a task;
determining a task type corresponding to the generated task;
determining a critical condition corresponding to the determined task type;
allocating the task to at least one of a first operating device or a second operating device based on the determined critical condition;
determining whether a performance control condition is generated based on the allocated task, the performance control condition comprising a condition in which a load slope value of a load rate corresponding to the task changes from a predetermined slope value; and
migrating the allocated task to another operating device based on a result of the determining of whether the performance control condition is generated.

15. The non-transitory computer-readable storage medium of claim 14, wherein the process of determining the critical condition comprises:
determining a critical parameter configured in correspondence with the determined task type.

16. The non-transitory computer-readable storage medium of claim 15, wherein the process of determining the critical condition comprises:

determining a critical parameter corresponding to a first critical condition when the generated task is a first type; and determining a critical parameter corresponding to a second critical condition when the generated task is a second type.

17. The non-transitory computer-readable storage medium of claim 14, wherein the task type includes at least one of a task type in which a high performance is sporadically required, a task type in which a predetermined performance is consistently required, a task type in which only a low performance is required, or a task type in which a fast response is required, and the determining of the critical condition comprises determining the critical conditions differently according to the task type.

18. The non-transitory computer-readable storage medium of claim 14, wherein the process of migrating comprises:

checking whether at least one of a change condition of a task load or a specific situation condition with the task is generated based on the critical condition;

identifying the task type in which the condition is generated;

when the task type corresponds to a specific type, migrating the task to the other operating device; and when the task type does not correspond to the specific type, operating the task in the allocated operating device.

19. The non-transitory computer-readable storage medium of claim 14, wherein the task type is divided based on at least one of a task workload amount, a data processing amount, a response speed, a processing time, an application type, or an operation scenario.

\* \* \* \* \*